United States Patent [19]
Krebs

[11] 3,831,542
[45] Aug. 27, 1974

[54] AUTOMATIC PILOT FOR SAILBOAT HAVING AN IMPROVED RUDDER CONTROL UNIT

[75] Inventor: David A. Krebs, Destin, Fla.
[73] Assignee: Earle P. Thurston, Fresno, Calif.
[22] Filed: June 13, 1973
[21] Appl. No.: 369,713

[52] U.S. Cl. .................. 114/144 C, 200/81.9 R
[51] Int. Cl. ............................................. B63h 25/04
[58] Field of Search........ 114/144 C, 144 R, 144 A; 200/52, 81.9 R, 81.9 M, 81.9 HG; 318/588

[56] References Cited
UNITED STATES PATENTS

| | | | |
|---|---|---|---|
| 2,318,671 | 5/1943 | Claytor | 200/81.9 R |
| 3,319,594 | 5/1967 | Gianoli | 114/144 C |
| 3,685,478 | 8/1972 | Casani et al. | 318/588 |
| 3,691,978 | 9/1972 | Bond | 318/588 |
| 3,737,635 | 6/1973 | Hastings | 114/144 R |

*Primary Examiner*—Trygve M. Blix
*Assistant Examiner*—Stuart M. Goldstein
*Attorney, Agent, or Firm*—Huebner & Worrel

[57] ABSTRACT

An automatic pilot including a rudder control unit having a bidirectional electric motor for driving the rudder of a sailboat having motor input terminals, switching circuitry associated with the motor for controlling the supply of electrical power to the input terminals, and a device mounted on the sailboat, preferably a wind sock, which operates to sense wind direction, connected with the switching circuitry for dictating the condition of the circuitry in response to changes in wind direction, whereby the sailboat is automatically piloted as a function of wind direction.

8 Claims, 7 Drawing Figures

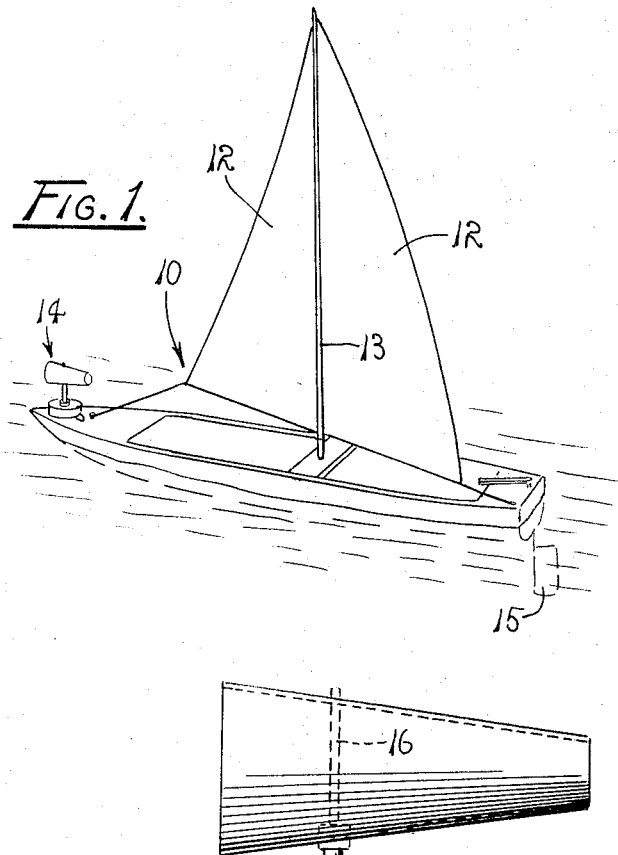
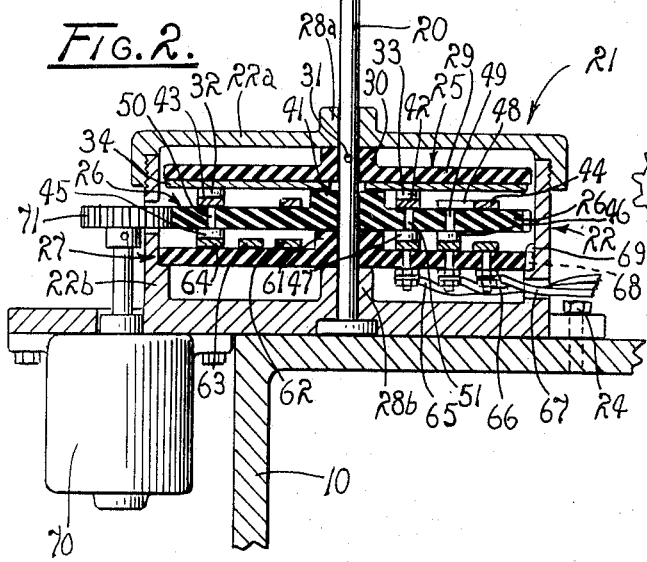
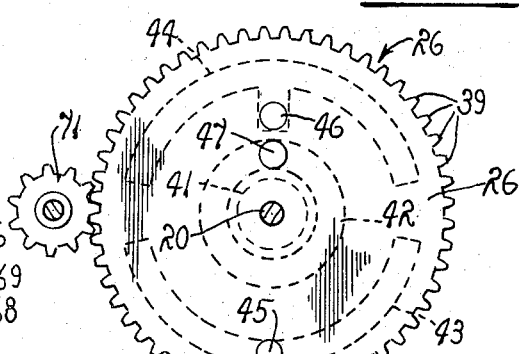
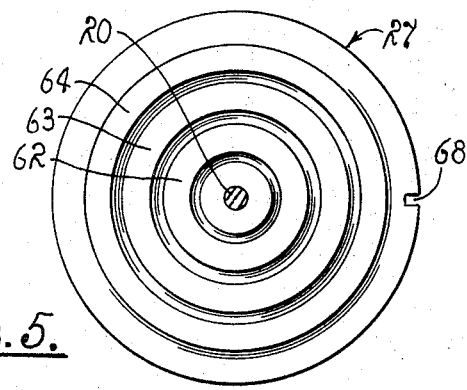

AUTOMATIC PILOT FOR SAILBOAT HAVING AN IMPROVED RUDDER CONTROL UNIT

BACKGROUND OF THE INVENTION

The present invention relates to an automatic pilot for automatically piloting a sailboat, including an improved rudder control unit.

In sailing it is important to maintain the sails of a sailboat properly positioned with respect to the wind, first to obtain maximum speed and secondly for safety reasons, i.e. to prevent the boat from tipping over. To maintain the sails properly positioned with respect to the wind, it is generally necessary to continually change the course being steered to compensate for variations and changes in wind direction. Such frequent course changes are tiresome to the person steering. Further, the need to be constantly making such course changes can take much of the pleasure and relaxation out of the recreation provided by the sport of sailing.

SUMMARY OF THE INVENTION

It is, accordingly, an object of the present invention to provide an improved rudder control unit for a sailboat.

It is further an object of the present invention to provide an improved piloting apparatus which automatically steers a boat as a function of wind direction and is thereby operable to maintain the sails thereof properly positioned with respect to the wind.

In accomplishing these and other objects, there is provided in accordance with the present invention an improved rudder control unit having a bidirectional electric motor for driving a rudder of a sailboat including an input terminal associated with each direction of motor rotation. Switching circuitry is coupled with the motor for controlling the supply of electrical power to the motor input terminals. The operation of the switching circuitry is controlled as a function of wind direction by a device, such as a wind sock, mounted on the sailboat, for sensing changes in wind direction.

BRIEF DESCRIPTION OF THE DRAWINGS

FIG. 1 is a perspective view of a sailboat containing an automatic pilot including an improved rudder control unit according to the present invention.

FIG. 2 is a side sectional view of a wind sock and switching mechanism mounted on the bow of the sailboat shown in FIG. 1.

FIG. 3 is a bottom view of a bridging arm employed in the switching mechanism of FIG. 2.

FIGS. 4a and 4b are top and bottom views, respectively, of an upper plate provided for the switching mechanism of FIG. 2.

FIG. 5 is a top view of a lower plate provided for the switching mechanism of FIG. 2.

DETAILED DESCRIPTION OF THE PREFERRED EMBODIMENT

Figure 6:
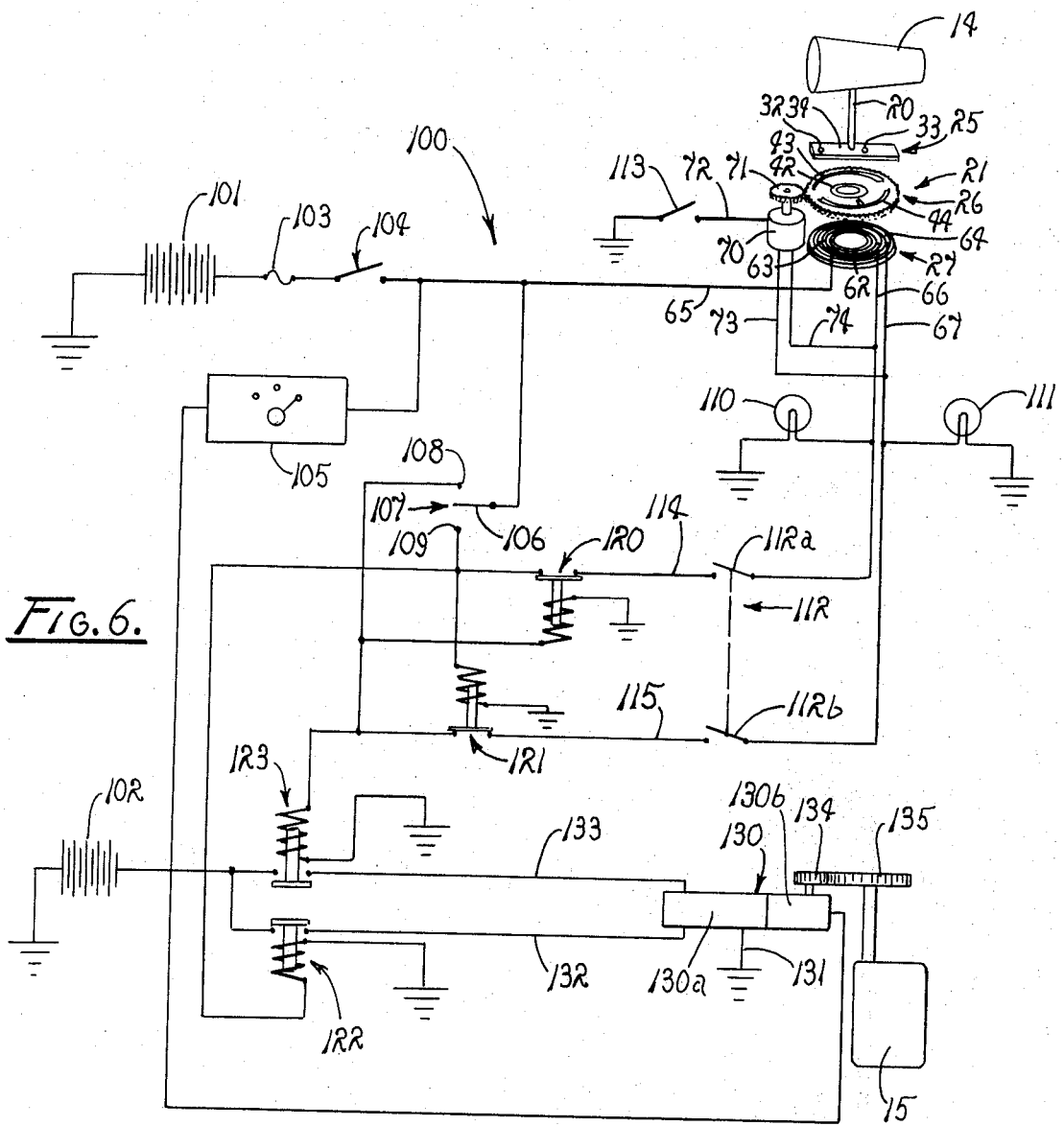
FIG. 6 is a diagrammatic view of a circuit provided for the automatic pilot.

Referring to the drawings in more detail, there is shown in FIG. 1 a sailboat 10 sailing on a body of water 11. The boat 10 has sails 12 mounted on a mast 13, a device for sensing wind direction in the form of a wind sock 14 mounted centrally on its bow and a rudder 15 for steering the boat mounted on its stern, and connected with a rudder control unit, not designated, which embodies the principles of the instant invention.

The wind sock 14 is shown in FIG. 2 mounted on an extending shaft 20 upwardly extended from a rotary switch mechanism, designated 21. Where desired, the shaft is supported by suitable bearings, not shown, adapted to be adjusted for varying the magnitude of friction applied thereto so that the sensitivity of the sock can be controlled as the shaft 20 is rotated. The sock 14 is secured to the shaft 20 by means of a suitable pin 16 which extends vertically through the sock 14. The switch 21 includes a housing 22 made up of a top portion 22a and a bottom portion 22b. The bottom housing 22b is fixed by bolts 24 on the bow of the boat 10 while the top 22a fits upon the upper end of the bottom housing 22b. An assembled view of the switch mechanism 21 is shown in FIG. 2.

The switch 21 further includes a bridging arm 25, an upper plate 26 and a lower plate 27. The arm 25, plate 26 and plate 27 are of each substantially the same diameter and are disposed in a coaxial, stacked relationship within the housing 22. The shaft 20 is supported for rotation by bushings including collars 28a and 28b formed on the upper and lower housing portions 22a and 22b, respectively. Moreover, the shaft 20 extends centrally through the arm 25, plate 26 and plate 27 and is permitted to rotate relative to the plates 26 and 27 while the arm 25 is fixed thereto.

The construction of the bridging arm 25 is shown in FIGS. 2 and 3. Preferably, the arm 25 is made of an insulative base 29 having a collar 30 formed on its uppermost surface. The collar 30 defines the central opening through which the shaft 20 extends while a pin 31 is extended through the collar 30 to pin the arm 25 to the shaft 20. At the opposite surface of the arm there is provided a pair of downwardly extending electrical contacts or brushes 32 and 33. These contacts are electrically interconnected through an electrically conductive bus 34 affixed to the base 29 of the arm. The contact 32 is mounted towards the outside end of the arm 25 while the contact 33 is mounted nearer the arm's center so that the contacts are asymmetrically related to the shaft 20.

The construction of the switch plate 26 is best shown in FIGS. 2, 4a and 4b and includes a reference axis designated by an arrow 38. This plate is made of an insulative material and includes peripheral teeth 39, as well as a bushing collar 41 formed at its uppermost surface, through which the shaft 20 is extended. On the upper surface of the plate 26 there are affixed three contacts designated 42, 43 and 44. The contact 42 is in the shape of a circular ring, concentric with the center of the plate 26, having a radius equal to the distance between the contact 33 and the center of the shaft 20. The contacts 43 and 44 are of an arcuate configuration having radii equal to the distance between the contact 32 and the center of the shaft 20. The contacts 43 and 44 each define arcs slightly less than 180°, or a half circle, by a predetermined number of degrees, and are symmetrically related to the center of the plate 26. The arcuate contacts 43 and 44 are mounted on opposite sides of and symmetrically positioned with respect to the reference axis of the plate, indicated by the arrow 38 shown in FIG. 4a. The arrow 38, which indicates the reference axis of the plate 26, normally is orientated so that it parallels the longitudinal axis of the sailboat 10.

Therefore, it should be apparent that gaps or spaces, not designated, of predetermined width greater than the width of the contact 32, are provided between the adjacent ends of the contacts 43 and 44.

Mounted on the lower side of the plate 26 are downwardly extending electrical contacts 45, 46 and 47. The contact 45 is mounted in radial alignment with and below the contact 43 and is electrically connected thereto by means of a conductive pin 50 extending therebetween. Similarly, the contact 46 is mounted below an electrically conductive extension 48 extending radially inwardly from the contact 44. The contact 46 is electrically connected to the extension 48 by means of a conductive pin 49 extending therebetween. Hence, it is apparent that the contacts 44 and 46 are electrically interconnected. The contact 47 is mounted in radial alignment with and below the contact 42 and is electrically connected thereto by interconnecting an electrically conductive pin 51.

The construction of the switch plate 27 is best illustrated in FIGS. 2 and 5. This plate also is made of an insulative material having collar structure 61, formed on its uppermost surface, through which the shaft 20 is extended. On the upper surface of the plate 27 are mounted three concentric contacts 62, 63 and 64. The radii of the contacts 62, 63 and 64 are equal, respectively, to the radial distance at which the contacts 47, 46 and 45 are located from the center of the shaft 20. As shown in FIG. 2, electrical leads 65, 66 and 67 are connected to the contacts 62, 63 and 64, respectively. The contacts 62, 63 and 64 operate as voltage pickoffs for picking off electrical signals from the fixed contacts 42, 44 and 43, respectively.

The switch plates 26, 27 and the bridging arm 25 are stacked on the shaft 20 and their body portions are held spaced apart by the collars 30, 41 and 61 so that aligned adjacent electrical contacts on the arm 25 and plates 26, 27 make sliding contact with each other. The plate 27 is rigidly held relative to the switch housing 22 by the slot 68 formed therein and mated with a key 69 provided on the bottom housing 22b.

A bidirectional DC motor 70 having a pinion 71 mounted on its output shaft is bolted on the switch housing 22. The pinion 71 engages the peripheral gear teeth 39 of the switch plate 26 whereby the motor 70 may be energized for imparting rotation to the plate. Thus, the axis of the switch plate 26, designated by the arrow 38, may be selectively orientated with respect to the longitudinal axis of the sailboat 10. The motor 70 is of any suitable design and includes three electrical leads 72, 73 and 74, as illustrated in FIG. 6. The lead 72 serves to connect the motor windings to a reference or ground potential, the lead 73 serves as an input for electrical signals applied to drive the motor 70 and thereby rotate the switch plate 26 in one direction while the lead 74 serves as an input for applying an electrical signal for driving the motor 70 and plate 26 in opposite directions.

Batteries 101 and 102, of suitable voltage level, such as twelve volts DC, are included within a circuit, generally designated 100, provided for the rudder control unit. The battery 101 is for powering the switching circuitry while the battery 102 is for supplying power to drive the rudder 15. Of course, a single battery, suitably connected, can be employed equally as well.

The battery 101 has its positive electrode grounded and its negative electrode connected through a fuse 103 to one terminal of a manual on-off switch 104. The second terminal of the switch 104 is commonly connected to clutch circuitry, designated 105, the lead 65 of the switch mechanism 21 and a movable contact 106 of a two position test switch 107. This switch further includes contacts 108 and 109 so positioned as to be contacted alternatively by the contact 106. The clutch circuitry 105 preferably includes a three-position clutch switch through which control over a drive train, not designated, for the rudder 15 is maintained. The positions for the switch are "off", clutch engaged and clutch disengaged.

Connected to the leads 66 and 67 of the switch mechanism 21 are, respectively, motor leads 74, and 73. Connected to these leads are terminals of test lamps 110 and 111 and a pair of ganged, movable contacts 112a and 112b of a manually operable switch 112. The lead 72 of the motor 70 preferably is connected to ground through an on-off switch 113. Of course, the lamps 110 and 111 also are grounded so that the lamps can be electrically energized.

The movable switch contacts 112a and 112b are ganged, as indicated by a broken line, for coordinate action and their fixed contacts are connected, respectively, to voltage buses 114 and 115. Connected to the buses 114 and 115 are the contacts 108 and 109, respectively, of the switch 107.

Connected in series between the bus 114 and ground are the fixed contacts of a normally closed solenoid switch 120, the coil of a normally closed solenoid switch 121 and the coil of a normally open solenoid switch 122. Connected in series between the bus 115 and ground is the coil of the solenoid switch 120, the fixed contacts of the solenoid switch 121, and the coil of a normally open solenoid switch 123.

Within the drive train, aforementioned, there is a gear box mechanism 130, illustrated in FIG. 6, which includes a bidirectional DC motor 130a and a solenoid actuated clutch 130b connected with the circuitry 105. It is to be understood that the clutch 130b is caused to be engaged or disengaged in response to a selective manipulation of the switch 105. The mechanism 130 has a common lead 131 grounded and motor control leads 132 and 133, which define inputs connected, respectively, through the fixed contacts of the solenoid switches 122 and 123 to the negative electrode of the battery 102. The positive electrode of the battery 102, of course, is grounded. The mechanism 130 also has a pinion gear 134 which is connected with the motor 130a through the clutch 130b. The gear 134 meshes with a gear 135 mounted on a suitable drive shaft for the rudder 15. Consequently, the rudder 135 may be steered by driving the motor 130a, through the clutch 130b, or through a manual manipulation, by means, not shown, with the clutch 130b in a disengaged condition.

Assuming that the manual switches 104, 107, 112 and 113 are initially open, while the clutch 130b is engaged, the rudder control unit is operated in the following manner.

The switch 104 is first closed to supply power to the switching circuitry 100. Before energizing the unit, the operation of the circuitry driving the rudder 15 may be checked by manually switching switch contact 106 into engagement with either of the fixed contacts 108 and 109. Closing switch contacts 106 and 108 applies a negative voltage to bus 114 which energizes the solenoid switch 121 to prevent inadvertent energization of the solenoid 123 while closing the solenoid switch 122. Thereby, the battery 102 is caused to supply power to control lead 132 whereby the bidirectional motor 130 and rudder 15 are driven in a predetermined direction. Similarly, a closure of the switch 107 wherein contacts 106 and 109 are engaged opens the solenoid switch 120 and closes the switch 123 to apply a negative voltage to the other motor control lead 133 for driving the motor 130 and rudder 15 in the opposite direction.

Once the circuitry for driving the rudder 15 thus has been checked, the switch 107 is switched to its center or off position. The sailboat 10 is now steered preferably manually, in a manner such that the rudder 15 causes the sails 12 to be correctly positioned with respect to wind direction. The wind sock 14 automatically aligns itself with this selected wind direction thereby to orientate itself and the bridging arm 25 relative to the longitudinal axis of the sailboat 10 in a selected reference or ideal position. The switch 113 is now closed.

Assuming that the axis of the plate 26 defined by the arrow 38 is not aligned with the ideal wind direction represented by the instant position of the arm 25, the negative voltage appearing on the lead 65 is transmitted through the contacts 62, 47, 42, 33 and 32 to either the arcuate contact 43 or the arcuate contact 44, depending on the direction of misalignment between the arm 25 and the axis of the plate 26. If the negative voltage is received on the arcuate contact 43, as shown in FIG. 2, it is transmitted therefrom by contacts 45 and 64 and appears on the lead 67 as a negative driving voltage which drives the motor 70 to rotate the axis of the plate 26 into alignment with the instant position of the bridging arm 25 and wind sock 14. Similarly, if the negative voltage is instead received on the arcuate contact 44, it is transmitted therefrom to the lead 66 via contacts 44, 46 and 63 to appear on lead 66 as a driving voltage. Once the axis of the plate 26 has been driven into alignment with the arm 25, no driving voltage appears on either the leads 66 or 67 since the contact 32 on the arm 25 will be positioned between the arcuate contacts 43 and 44. The switch 113 is now opened and the switch 112 is now closed.

Closure of the switch contacts 112a and 112b energizes the rudder control unit. As wind direction changes, the wind sock 14 and arm 25 are moved out of alignment with the reference position, now defined by the axis of the plate 26. Movement of the wind sock 14 in one direction brings the arm contact 32 in contact with the arcuate contact 43 and in the other direction in contact with the arcuate contact 44. As a result, negative voltage control signals representing left or right steering errors will be generated on the leads 66 and 67 and transmitted through the switch contacts 112a and 112b to the buses 114 and 115. It is noted that each time a negative voltage signal is generated on the leads 66 or 67 the appropriate one of the lamps 110 and 111 is illuminated to indicate the direction of the error.

The steering error signals appearing on the buses 114 or 115 operate in the manner above described in connection with the switch 107 to drive the mechanism 130 so as to steer the rudder 15 in the appropriate direction to realign the wind sock 14 and arm 25 with the axis of the plate 26. Thereby, the sailboat 10 is automatically piloted to keep the sails 12 properly positioned with respect to wind direction. It is noted that if the wind sock 14 is to the left of the axis of the plate 26 the rudder 15 will be turned to the left to realign the arm 25 with the plate axis 38 and vice versa. It should be appreciated that the bridging arm 25 functions as a movable contact in the switching mechanism 21 while the fixed contacts on the plate 26 operate to define the reference wind direction relative to the longitudinal axis of the sailboat 10. It is also noted that any suitable device, such as a wind vane or other arrangement, may be employed in place of the wind sock 14 for maintaining the bridging arm 25 aligned with the wind, and suitable limit switches, not shown, are employed, where so desired, for limiting the throw of the rudder 15.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. In an automatic pilot for a sailboat an improved rudder control unit comprising:
   A. means for connecting said unit with a rudder for a given sailboat;
   B. means for establishing a selected axis on said given sailboat relative to its longitudinal axis;
   C. sensing means for sensing wind direction relative to said selected axis, said sensing means being operable to generate a first or a second electrical control signal whenever the direction of the wind is more than a predetermined number of degrees to one or the other side of said axis, respectively, including a wind direction sensing device rotatably mounted on said sailboat for sensing wind direction by physically aligning itself with the direction of the wind;
   D. rotary switch means having a movable contact arm and at least first, second and third fixed contacts, said first fixed contact defining a circular ring of a first predetermined radius around and concentric with the axis of rotation of said wind direction sensing device, said second and third fixed contacts each defining arcuate segments of a predetermined number of degrees less than 180 angular degrees and being of a second predetermined radius different than said first radius, said second and third fixed contacts being positioned symmetrically and concentric with respect to the axis of rotation of said wind direction sensing device, whereby said selected axis is defined by an imaginary line drawn through the axis of rotation of said wind direction sensing device midway between said second and third fixed contacts, said contact arm being connected to said wind direction sensing device for coordinate rotation therewith and having one arm contact positioned to rotate in sliding contact with said first fixed contact and another contact positioned to make sliding contact with said second and third fixed contacts when radially aligned therewith;
   E. means for connecting said first fixed contact to a voltage source;
   F. first voltage pickoff means for sensing an electrical signal on said second fixed contact, whereby whenever a voltage is applied to said first fixed contact and said movable contact arm is positioned to transmit this voltage to said second fixed contact said first electrical control signal is generated on said first voltage pickoff means;

G. second voltage pickoff means for sensing an electrical signal on said third fixed contact, whereby whenever a voltage is applied to said first fixed contact and said movable contact arm is positioned to transmit this voltage to said third fixed contact said second electrical signal is generated on said second voltage pickoff means; and H. means responsive to said first and second electrical control signals for turning the rudder of said given sailboat in one direction in response to said first electrical control signal and in the opposite direction in response to said second electrical control signal to steer said sailboat to bring said selected axis substantially in alignment with the direction of the wind.

2. The unit of claim 1, including means for selectively rotating the position of said first, second and third fixed contacts aroung the axis of rotation of said wind direction sensing device whereby to change the orientation of said selected axis defined by said second and third fixed contacts relative to the longitudinal axis of said sailboat.

3. The unit of claim 2, wherein said means for selectively rotating the position of said first, second and third fixed contacts includes:

a plate mounted for rotation about the axis of rotation of said wind direction sensing device having mounted thereon said first, second and third fixed contacts;

bidirectional motor means having first and second input terminals corresponding, respectively, to opposite directions of motor rotation, said motor means having one of said input terminals connected to said first voltage pickoff means and its other one of said input terminals connected to said second voltage pickoff means, said motor means also having a switch for selectively energizing or deenergizing it; and gear means driven by said motor means connected to rotate said plate whenever said motor means is driven by said first or second electrical control signals appearing on said first and second voltage pickoff means.

4. The unit of claim 1, wherein said means for turning the rudder of said sailboat includes:

bidirectional motor means having first and second input terminals corresponding, respectively, to opposite directions of motor rotation;

gear means connected with said rudder;

clutch means for selectively connecting said motor means with gear means;

a first normally open solenoid switch means for connecting said first input terminal to a voltage source, said first normally open solenoid switch means having its coil connected to receive said first electrical control signal whereby to be energized thereby; and a second normally open solenoid switch means for connecting said second input terminal to a voltage source, said second normally open solenoid switch means having its coil connected to receive said second electrical control signal whereby to be energized thereby.

5. The unit of claim 4, including means for selectively rotating the position of said first, second and third fixed contacts around the axis of rotation of said wind direction sensing device whereby to change the orientation of said selected axis defined by said second and third fixed contacts relative to the longitudinal axis of said sailboat.

6. The invention defined in claim 5, wherein said means for selectively rotating the position of said first, second and third fixed contacts includes:

a plate mounted for rotation about the axis of rotation of said wind direction sensing device having mounted thereon said first, second and third fixed contacts;

second bidirectional motor means having first and second input terminals corresponding, respectively, to opposite directions of motor rotation, said second motor means having one of said input terminals connected to said first voltage pickoff means and its other one of said input terminals connected to said second voltage pickoff means, said second motor means also having a switch for selectively energizing or deenergizing it; and second gear means driven by said second motor means connected to rotate said plate whenever said second motor means is driven by said first or second electrical control signals appearing on said first and second voltage pickoff means.

7. The invention defined in claim 6, including:

a first normally closed solenoid switch means connecting said first voltage pickoff means to the coil of said first normally open solenoid switch means, said first normally closed solenoid switch means having its coil connected to receive said second electrical control signal whereby to be energized thereby; and a second normally closed solenoid switch means connecting said second voltage pickoff means to the coil of said second normally open solenoid switch means, said second normally closed solenoid switch means having its coil connected to receive said first electrical control signal whereby to be energized thereby.

8. The invention defined in claim 7, wherein said wind direction sensing device is a wind sock, and including:

first on-off switch means connected to control the supply of voltage to said first fixed contact;

second on-off switch means connected to control the transmission of said first and second electrical control signals to the coils of said first and second normally open solenoid switch means; and means for selectively energizing the coils of either said first or second normally open solenoid switch means whereby to test the operation of said rudder turning means.

* * * * *